B. EITNER.
BALL GRINDING MACHINE.
APPLICATION FILED MAR. 26, 1910.
977,719.
Patented Dec. 6, 1910.
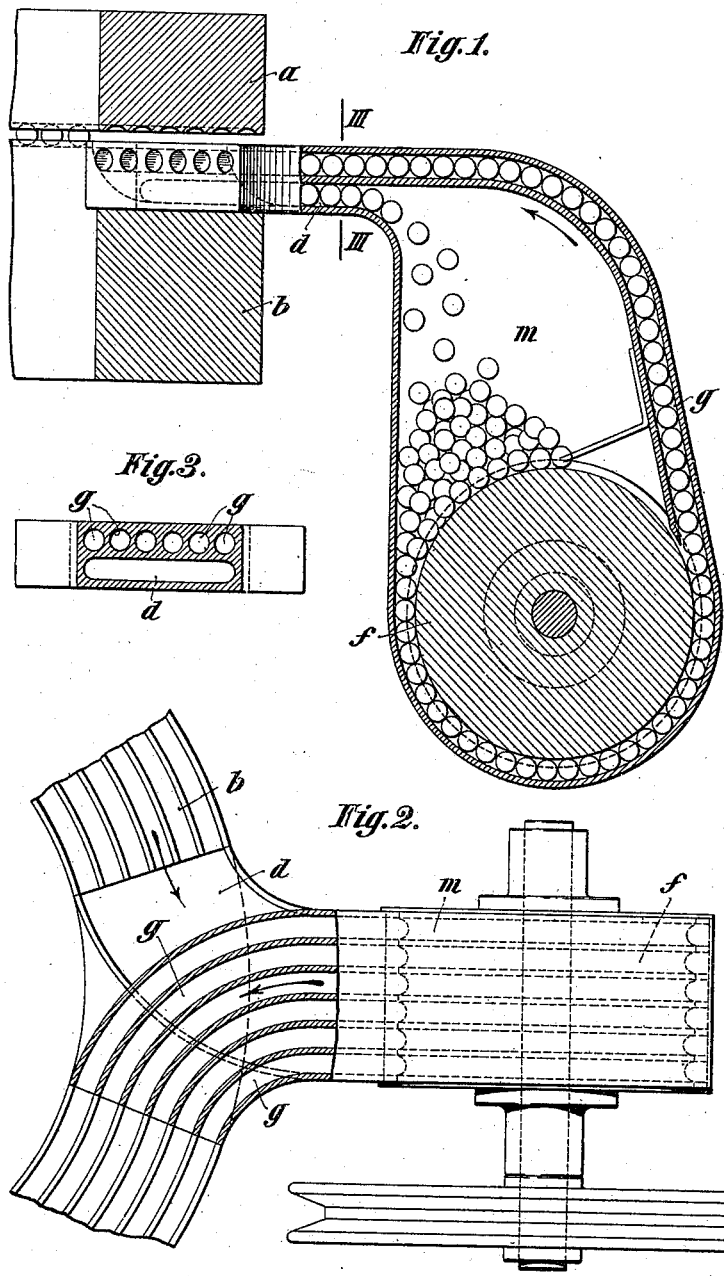
WITNESSES:
INVENTOR:
Berthold Eitner,
By Attorneys,

UNITED STATES PATENT OFFICE.

BERTHOLD EITNER, OF BERLIN, GERMANY.

BALL-GRINDING MACHINE.

977,719. Specification of Letters Patent. Patented Dec. 6, 1910.

Application filed March 26, 1910. Serial No. 551,673.

*To all whom it may concern:*

Be it known that I, BERTHOLD EITNER, work-master, a subject of the King of Prussia, residing at No. 14 Gotzkowskystrasse, Berlin, in the Kingdom of Prussia, Germany, have invented certain new and useful Improvements in and Relating to Ball-Grinding Machines, of which the following is a full, clear, and exact description.

The present invention relates to ball grinding machines of the kind described in my prior application for Patent, Nr. 515,388, filed August 31, 1909, with horizontal plates having a plurality of annular channels and an automatic means to transfer the balls from one channel to another. In accordance with the said application the arrangement is such that the balls are received by delivery passages and conducted to a receptacle arranged at a lower level in which the mixing takes place, then, by means of a conveyer device, the balls are reconducted through suitable guide passages within reach of the channel paths.

Now the present invention has for its object a modification of this arrangement whereby the apparatus is simplified, while at the same time the operation is accelerated.

The improvement is illustrated in the accompanying drawing in which:

Figure 1 shows the ball guiding and mixing apparatus in conjunction with the grinding plates in vertical cross section. Fig. 2 is a top view corresponding to Fig. 1 partly in section. Fig. 3 is a vertical cross section on the line III—III in Fig. 1.

As in the construction described in my prior specification a collecting and mixing receptacle $m$ is arranged beneath the fixed lower plate $b$ of the pair of plates $a$ $b$; this receptacle receives the balls conducted after each revolution into the annular channels through the interruption of the same, the balls being reconducted by the channeled plate $b$ (conveyer cylinder) mounted on the bottom of the mixing receptacle through the supply passages $g$ into the grinding channels.

Now while in the construction covered by the aforesaid application No. 515,388 the balls are delivered through separate individual passages corresponding with the annular channels, in this case for the sake of simplicity and in order to accelerate the delivery a common collecting passage $d$ is provided; this passage is smooth and undivided and its full width connects with the channels in the fixed plate $b$. In this manner the balls conducted from the channels perfectly freely and unimpeded by partitions are able to roll toward the mixing chamber with their full velocity. The return passages $g$, as before, are separated one from the other so that in the return the positive transfer of the mass of balls, which has already been broken up into separate rows by the channels of the conveyer plate, into the channels is insured.

What I claim as my invention and desire to secure by Letters Patent is:

The combination of a pair of plates, a mixing receptacle below said plates, and an undivided collecting passage connected with channels in one of said plates, said undivided passage leading to the mixing receptacle.

In witness whereof, I have hereunto signed my name in the presence of two subscribing witnesses.

BERTHOLD EITNER.

Witnesses:
ROBERT MICHELSKI,
HENRY HASPER.